(12) United States Patent
Andersen

(10) Patent No.: US 6,658,110 B1
(45) Date of Patent: Dec. 2, 2003

(54) ELECTROACOUSTIC COMMUNICATIONS UNIT

(75) Inventor: Morten Kjeldsen Andersen, Odder (DK)

(73) Assignee: Sonionkirk A/S, Horsens (DK)

(*) Notice: Subject to any disclaimer, the term of this patent is extended or adjusted under 35 U.S.C. 154(b) by 0 days.

(21) Appl. No.: 09/806,754
(22) PCT Filed: Oct. 4, 1999
(86) PCT No.: PCT/DK99/00521
§ 371 (c)(1),
(2), (4) Date: Apr. 3, 2001
(87) PCT Pub. No.: WO00/21330
PCT Pub. Date: Apr. 13, 2000

(30) Foreign Application Priority Data

Oct. 5, 1998 (DK) ......................................... 1998 01254

(51) Int. Cl.⁷ ................................................ H04M 1/00
(52) U.S. Cl. .................................................. 379/433.02
(58) Field of Search ....................... 379/433.02, 433.01, 379/430

(56) References Cited

U.S. PATENT DOCUMENTS

| 4,160,135 | A |   | 7/1979  | Görike          |           |
|-----------|---|---|---------|-----------------|-----------|
| 4,239,945 | A |   | 12/1980 | Atoji et al.    |           |
| 5,729,605 | A | * | 3/1998  | Bobisuthi et al.| 379/433.02|
| 6,104,808 | A | * | 8/2000  | Alameh et al.   | 379/433.02|
| 6,148,080 | A | * | 11/2000 | Collin          | 379/433.02|
| 6,282,287 | B1| * | 8/2001  | Lin             | 379/433.02|

FOREIGN PATENT DOCUMENTS

| DE | 28 15 135 B1  | 8/1979  |
| DE | 28 15 051 C2  | 9/1983  |
| DE | 195 26 810 A1 | 1/1997  |
| EP | 0 364 935 A1  | 4/1990  |
| EP | 0 753 982 A2  | 1/1997  |
| EP | 0 909 110 A2  | 4/1999  |
| GB | 2 311 187 A   | 9/1997  |
| JP | A 61-139189   | 6/1986  |
| WO | WO 97/47117   | 12/1997 |
| WO | WO 98/24214   | 6/1998  |

* cited by examiner

Primary Examiner—Jack Chiang
(74) Attorney, Agent, or Firm—Oliff & Berridge, PLC

(57) ABSTRACT

An electroacoutic communications unit with a receiver transducer in a housing. The communications unit has accoustic connections both from the front side of the diaphragm of the transducer and from its rear side to the area inwardly of the face of the unit for engagement with a user's ear as well as to the area outwardly of this engagement face. These four acoustic connections constitute the four branches of an acoustic balance bridge with the transducer as a generator. This configuration is particularly expedient, as it is hereby possible to reduce the inner air volume in the communications unit behind the diaphragm of the transducer to a size which is without importance for the size of the telephone in practice. Furthermore, variations in the degree of tightness of the engagement of the communications unit with the user's ear will only influence the frequency characteristic to a very limited degree.

8 Claims, 2 Drawing Sheets

ELECTROACOUSTIC COMMUNICATIONS UNIT

BACKGROUND OF THE INVENTION

The invention relates to an electroacoustic communications unit such as a mobile telephone and a telephone handset to be held in engagement with a user's ear, but also a headphone.

Particularly in the field of mobile telephones there has been a development toward units which both weigh less and less and are less and less bulky. This makes great demands on designers and manufacturers of electronic and electroacoustic components, which here comprise microphone and sound generator or receiver transducers. These transducers, too, are available toady in smaller dimensions than before.

The electroacoustic receiver transducers used here have a diaphragm for generating acoustic signals in the form of sound with frequencies in the audible range. The transducer is typically arranged closely adjacent to the inner side of the housing of the telephone, there being acoustic connections in the form of apertures whose shape is carefully adjusted to give the correct acoustic impedance and frequency characteristic in engagement with the user's ear. The diaphragm moves and emits sound from its front side, and for the transducer to operate satisfactorily, it is necessary that an air volume of a certain size is available to the rear side of the diaphragm, since the diaphragm will otherwise be blocked and prevented from moving. A too small air volume available to the rear side of the diaphragm will reduce the sensitivity of the transducer and will result in a frequency characteristic having an unfortunate course in the form of a notch. Therefore, so far, mobile telephones and telephone handsets have necessarily had such a volume in the housing, and the size of this volume has so far been a limitation for their designers and manufacturers.

Mobile telephones and telephone handsets are tested for their acoustic quality using an ear simulator which is standardized, e.g. according to IEC 318, IEC 711 or corresponding standards, all of which are based on the situation of use, where a user holds the telephone or the handset against his ear. To ensure reproducible measurements, these standards provide guidelines for the mechanical structure of the ear simulator and its acoustic function with a view to simulating a human ear as best as possible, and it is laid down how to carry out a test, including how to engage the telephone with the ear simulator, and in particular the accurate position and orientation of the telephone relative to the ear simulator. This means that, for a given telephone, and on the basis of the standards, it is possible to define the engagement face of the telephone with the ear simulator in the standardized test, which, according to the standard, will correspond to engagement with a user's ear. In the following, the expression "face for engagement with a user's ear" will therefore be used as a synonym for the engagement of the communications unit with a standardized ear simulator, as these faces are identical according to the foregoing. Such standardized ear simulators are commercially available e.g. from Brüel & Kjær as type 4157, type 4185 and type 4195. The engagement face is typically a circular area with a diameter of 25 mm, the ear simulator having a ring-shaped engagement face with a 25 mm diameter. Inwardly of the ring-shaped engagement face of the ear simulator there is an air volume corresponding to the volume of the human outer ear. This volume is the sound entrance opening of the ear simulator to a microphone by means of which the sound from the telephone may be registered.

The size of the air volume in the sound entrance of the ear simulator essentially influences the acoustic loading of the receiver transducer of the communications unit. Any leakage to the surroundings may cause a considerable increase in this volume, which gives a significant change in the acoustic loading. Changes in the acoustic loading may cause measurement results which do not correspond correctly to the acoustic properties of the communications unit which it is desired to measure. To achieve correct and reproducible measurements which are characteristic of the communications unit, the communications unit must therefore, in accordance with the standards, be in a tight fitting relationship with the ring-shaped engagement face of the ear simulator.

In use, there will be considerable variations in the degree of the tightness of the engagement of the communications unit with the user's ear, which gives greater or smaller acoustic leakages to the surroundings. Such variations influence the acoustic loading of the receiver transducer, which in turn, depending on the unit's sensitivity to the acoustic loading impedance, may change the acoustic properties of the communications unit. Such changes are perceived by the user as variations in the sound quality of the communications unit. This is undesirable.

Accordingly, there is a need for communications units which are leakage-tolerant, that is units which give a perceived sound quality for the user as well as measurement results on an ear simulator all of which, to the greatest extent possible, are independent of leaks or leakages both in the engagement of the unit with the user's ear and with the ear simulator.

Mobile telephones are made ever smaller, and telephones having a very small inner air volume cannot, with the prior art, readily be made leakage-tolerant, as leakage tolerance requires that the transducer has access to a certain air volume behind the transducer—typically some $cm^3$. A very large inner air volume is undesirable, since this will increase the size of the unit, and, as an alternative to a large inner air volume, acoustic openings could be established from a small inner air volume to the ambient air outside the telephone. The transducer would hereby have access via the small inner air volume to an infinitely large air volume, and a leakage-tolerant function could be achieved. Such a structure with a small inner volume will form an acoustic resonance circuit consisting of the acoustic inductance of these acoustic openings and the acoustic capacitance of the small inner air volume. Such a resonance circuit will cause the frequency response of the telephone to have a relatively deep and-sharp notch, which will unfortunately be in the middle of the useful audio frequency range and will be determined by the geometry of the openings and the inner air volume.

EP 364 935 describes a telephone handset with a receiver transducer, where the front side of the diaphragm is acoustically connected with the user's ear through acoustic openings in the handset, and moreover the front side of the diaphragm is acoustically connected with the inner cavity in the handset.

DE 2 815 051 and U.S. Pat. No. 4,239,945 describe various headphones, where an acoustic connection is see up between the front side of the diaphragm and its rear side, said connection including the volume in the user's outer ear.

WO 98/24214 describes a mobile telephone, where, inwardly of the telephone face for engagement with a user's ear, there is an acoustic connection to the front side of the diaphragm and an acoustic connection to the rear side of the diaphragm, whereby the telephone becomes leakage-tolerant. The receiver transducer is arranged eccentrically relative to the face for engagement with the user's ear.

All the above-mentioned known structures have a considerable air volume in the housing behind the diaphragm.

With a communications unit according to the invention, four acoustic connections are established from the diaphragm to the outer side of the housing, there being two connections from the front side of the diaphragm and two connections from its rear side, and both the front side and the rear side of the diaphragm are connected via respective acoustic connections with both the area inwardly of the face for engagement with a user's ear, that is with the user's ear, and with the area outwardly of this engagement face, that is with the ambient air. These four acoustic connections constitute the four branches in an acoustic balance bridge with the transducer as a generator.

By introducing a fourth acoustic connection between the front side of the diaphragm of the transducer and the air outside the communications unit, it is ensured that a leakage-tolerant unit may be constructed with a small inner air volume, as the effect of the acoustic resonance circuit may be cancelled to a great extent. The principle is that a leakage in the engagement with the user's ear will contribute to a notch in the frequency response via the connection to the front side of the diaphragm, while the effect will be, via the connection to the rear side of the diaphragm, a corresponding peak in the frequency response at the same frequency. This compensation will greatly be independent of the size of the leakage.

Thus, an acoustic balance bridge has been established. The notch in the frequency response curve will vary in frequency from one telephone to another because of tolerances in the connections to the air outside the telephone, but the effect of the acoustic balance bridge is that leakage variations will give changes in two of the branches of the bridge, and it is here the same acoustic resonance circuit which is included in both of the branches of the bridge which are affected by leakages, whereby variations in both frequency and amplitude are balanced, and the bridge will still be in balance.

This configuration, where both the front side of the diaphragm and its rear side are acoustically connected both with the user's ear and with the surrounding air, is particularly expedient, as it is hereby possible to reduce the inner air volume in the telephone behind the diaphragm of the transducer to a size which has no importance for the size of the telephone in practice. The small volume inevitably causes a relatively sharp resonance, that is with a relatively great amplitude variation in a relatively narrow frequency range, but, according to the foregoing, variations in both frequency and amplitude will be balanced.

In use, there will be variations in the degree of tightness of the engagement of the communications unit with the user's ear. These variations occur for the individual user from time to time, and there may also be considerable variations from one user to the other. With the invention, these variations only influence the frequency characteristic to a very small extent, because both the front side of the diaphragm and its rear side are connected with this variable degree of tightness, which is thereby incorporated in two branches of the acoustic bridge.

Thus, with the invention it is possible to construct a communications unit which is leakage tolerant and which just has a quite small inner air volume.

Mobile telephones and telephone handsets frequently have a housing consisting of two shells which are assembled along their edges. This assembly will be more or less tight, and in any event it will be difficult and expensive to make it completely tight sealed. According to the invention, the acoustic connection between the rear side of the transducer diaphragm and the surrounding air may advantageously be provided in relation to this assembly, and it may even be formed as a discontinuity in the form of an incision in one of the edges of the shells at the assembly. Leakages, if any, in the assembly between the shells outside this discontinuity form part of this acoustic connection, and variations in the leakage are compensated to a great extent by the invention.

A preferred embodiment of the invention will be described below with reference to the drawing, in which

DETAILED DESCRIPTION OF THE PREFERRED EMBODIMENT

Figure 1:
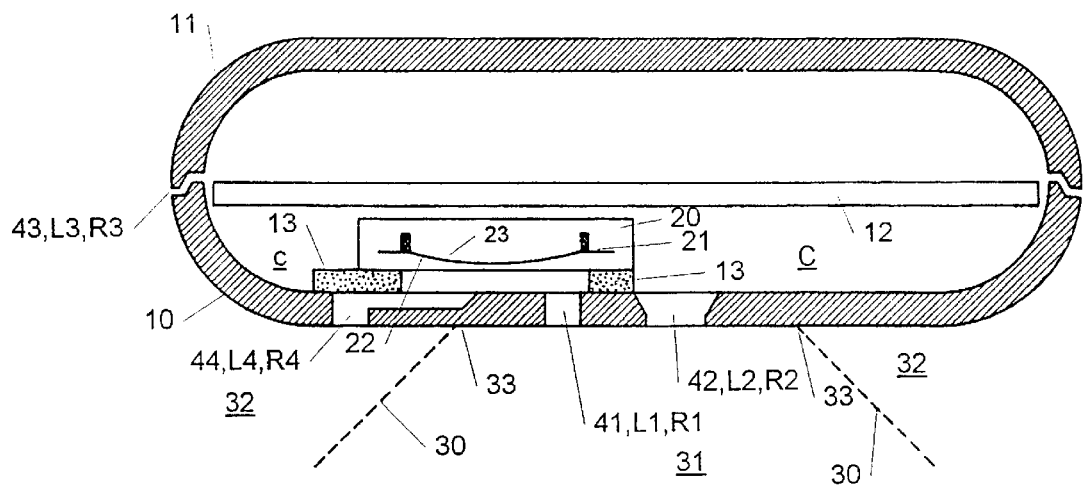
FIG. 1 shows a cross-section of a communications unit according to the invention.

FIG. 1 shows a cross-section of a mobile telephone which has a housing consisting of two shells, a front shell 10 and a rear shell 11. The housing accommodates a printed circuit board 12 on which electronic components, indicated by hatching, are mounted. A schematically shown receiver transducer 20 is mounted on the inner side of the front shell 10, e.g. by means of double-sided adhesive tape 13 which gives an acoustically tight seal. The transducer has a schematically shown diaphragm 21 with a front side 22 and a rear side 23 having mounted thereon a coil, which carries a coil in a magnetic field in a known manner so that the diaphragm can convert electrical signals into acoustic signals in a known manner. The front side 22 of the diaphragm faces inwards toward the front shell 10, and the rear side of the diaphragm faces toward the interior of the telephone. In FIG. 1, a volume C is shown around the transducer 20 behind the shell 10.

In FIG. 1, an ear simulator 30 is indicated in dashed line, and the telephone is shown schematically here in a standardized test position relative to the ear simulator. The telephone hereby engages the ear simulator with an engagement face 33 which defines an area 31 inwardly of the engagement face 33 and an area 32 outwardly of the engagement face 33, so that these two areas are separated from each other.

There is a first acoustic connection 41 from the front side 22 of the diaphragm of the transducer to the area 31 inwardly of the engagement face 33. This first acoustic connection 41 is the primary acoustic connection from the diaphragm 21 to the user's ear. There is a small volume between the front side 22 of the diaphragm and the shell 10, designed to be as small as possible so that, together with the acoustic impedance, it gives a resonance frequency which is outside the active frequency range of the telephone and thereby does not influence the sound quality, but merely serves as a short transmission line to the user's ear.

There is a second acoustic connection 42 from the rear side 23 of the diaphragm of the transducer through the volume C to the area 31 inwardly of the engagement face 33.

The first and second acoustic connections 41 and 42, respectively, thus connect the front side 22 of the diaphragm and its rear side 23, respectively, with the area 31, which represents the entrance opening to an ear simulator and the entrance opening to a user's ear.

The telephone has a third acoustic connection 43 from the rear side 23 of the diaphragm of the transducer and through the volume C to the area 32 outwardly of the engagement face 33. In the embodiment shown, this connection extends through an opening between the two shells 10 and 11 of the telephone, but it may also be formed as a separate opening in just one of the shells.

A fourth acoustic connection 44 connects the front side 22 of the diaphragm of the transducer with the area 32 outwardly of the engagement face 33. Also the fourth connection 44 is designed so that—like the first connection 41—it gives, together with the small volume between the front side 22 of the diaphragm and the shell 10, a resonance frequency which is outside the active frequency range of the telephone.

FIG. 1 shows the transducer 20 as a relatively small unit arranged at one side of the housing of the telephone, that is asymmetrically, the first and second connections being arranged together at the centre of the telephone. The structure shown here is also useful together with relatively large receiver transducers, but the structure is expedient particularly in the use of small transducers, as great freedom is achieved with respect to the position of the transducer in the housing, and, as shown, the transducer may be arranged offset relative to the engagement face 33, and it may even be arranged inclined relative to the housing.

Figure 2:
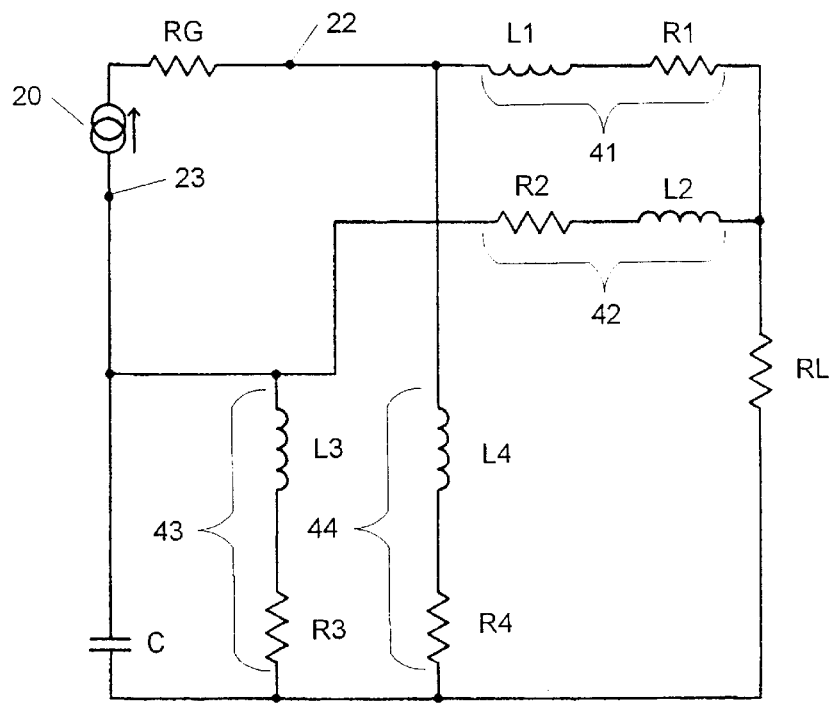
FIG. 2 shows a simplified equivalence diagram for the acoustic structure of FIG. 1, FIG. 3 schematically shows the position of a relatively large receiver transducer in a communications unit according to the invention, and FIG. 4 schematically shows the position of a relatively small receiver transducer in a communications unit according to the invention.

FIG. 2 shows a simplified electrical equivalence diagram for the above-mentioned acoustic structure in FIG. 1. The transducer 20 is shown here as a generator having an inner acoustic impedance RG, which is shown here as a pure resistance. Each of the four acoustic connections 41, 42, 43 and 44 is shown here as consisting of an inductance L1, L2, L3 and L4, respectively, in series with a resistance R1, R2, R3 and R4, respectively. The inductances represent air masses in the respective acoustic connections, and the resistances represent frictional losses in the connections. In the area 31 inwardly of the engagement face 33, the user's ear has an acoustic load impedance for the telephone, which is represented by a resistance RL in the electrical equivalence diagram. The volume C around the transducer 20 behind the shell 10 is represented by a capacitance C in the equivalence diagram.

It will be seen from FIG. 2 that the impedances representing the four acoustic connections constitute a bridge coupling with four branches and with the transducer 20 as a generator. The volume C, together with the acoustic connections 42 and 43 and in particular their inductances L2 and L3, form two resonance circuits, both of which are fed from the rear side 23 of the diaphragm and are connected in the equivalence diagram with their respective ends of the acoustic load RL. Clearly, by suitable dimensioning of the acoustic connections 42 and 43 to substantially the same resonance frequency and resonance width, the effect of these resonances on the acoustic load RL will neutralize each other. As a result, the acoustic output signal is essentially independent of the volume C in the telephone. This means that e.g. mobile telephones no longer have to have an acoustically active inner air volume to be leakage-tolerant, and these communications units may hereby be made even smaller.

Figure 3:
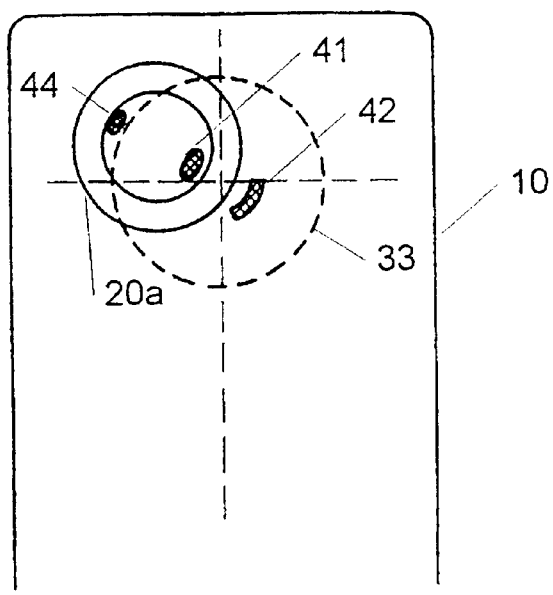

FIG. 3 schematically shows the inner side of the front shell 10 of a mobile telephone. The face 33 for engagement with a user's ear is shown here with its inner diameter 25 mm. A receiver transducer 20a with an outer diameter 20 mm is arranged offset relative to the engagement face 33. The first and second acoustic connections 41 and 42, respectively, are shown positioned around the centre of the engagement face 33, while the fourth acoustic connection 44 is positioned outwardly of the engagement face, but inwardly of the periphery of the transducer.

Figure 4:
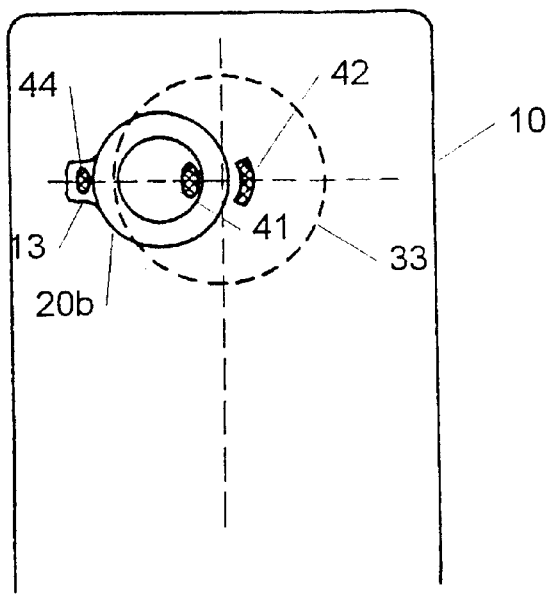

FIG. 4 likewise schematically shows the inner side of the front shell 10 of a mobile telephone with the same engagement face 33 with a diameter 25 mm like in FIG. 3. The receiver transducer 20b is here a smaller model with a diameter 15 mm, which thus corresponds to FIG. 1. In the same manner as in FIG. 3, the first and second acoustic connections 41 and 42, respectively, are shown located around the centre of the engagement face 33, just as the fourth acoustic connection 44, here too, is positioned outwardly of the engagement face, but here outwardly of the periphery of the transducer. Like in FIG. 1, the connection to the opening in the shell 10 is shaped as a depression or groove in the inner side of the shell 10, said groove extending below the double-sided adhesive tape 13.

What is claimed is:

1. An electroacoustic communications unit comprising
   a housing with a wall (10, 11) defining an interior and an exterior of the housing, and
   an electroacoustic transducer (20) accommodated for generating acoustic signals in the interior of the housing, the transducer (20) having a diaphragm (21) with a front side (22) and a rear side (23), said transducer (20) having a centre and being arranged in the interior of the housing with the front side (22) of the diaphragm facing toward the wall (10),
wherein acoustic connections (41, 42, 43, 44) each having an opening on an outer side of the housing are provided between the interior and the exterior of the housing, and, in relation to at least some of the openings, a face (33) for engagement of the communications unit with a user's ear (30) is delimited on the outer side of the housing, and wherein the acoustic connections comprise
   a first acoustic connection (41, L1, R1) from the front side (22) of the diaphragm and having its opening within the delimitation of the engagement face (33),
   a second acoustic connection (42, L2, R2) from the rear side (23) of the diaphragm and having its opening within the delimitation of the engagement face (33),
   a third acoustic connection (43, L3, R3) from the rear side (23) of the diaphragm and having its opening outside the engagement face (33),
characterized in that there is moreover
   a fourth acoustic connection (44, L4, R4) from the front side (22) of the diaphragm and having its opening outside the engagement face (33).

2. A communications unit according to claim 1, characterized in that the first, second, third and fourth acoustic connections form an acoustic bridge with four branches.

3. A communications unit according to claim 1, characterized in that the first, second, third and fourth acoustic connections have acoustic impedances (L1, R1; L2, R2; L3, R3; L4, R4) adapted to achieve a desired frequency characteristic for the communications unit in engagement with the user's ear.

4. A communications unit according to claim 3, characterized in that the acoustic impedances are adapted so that the frequency characteristic is essentially independent of the degree of tightness of the communications unit in engagement with the user's ear (30).

5. A communications unit according to claim 1, characterized in that the centre of the transducer is offset in the plane of the wall (10) relative to the centre of the communications unit face (33) for engagement with the user's ear (30).

6. A communications unit according to claim 1, characterized in that the housing comprises two shells (10, 11) which are assembled along their edges, and that the third acoustic connection (43, L3, R3) is provided at these edges.

7. A communications unit according to claim 6, characterized in that the third acoustic connection (43, L3, R3) comprises a discontinuity in an edge of ore of the shells (10, 11).

8. A communications unit according to claim 1, characterized in that a volume (C) in the communications unit forms part of the second acoustic connection (42) and of the third acoustic connection (43), and that the second acoustic connection (42) and the third acoustic connection (43) are adjusted to substantially the same resonance frequency and resonance width.

* * * * *